United States Patent [19]

Kojima et al.

[11] Patent Number: 4,785,720
[45] Date of Patent: Nov. 22, 1988

[54] LUBRICATION MECHANISM FOR PISTON PIN AND SNAP RING

[75] Inventors: Takio Kojima; Mitsuyoshi Kawamura; Shigeaki Akao, all of Aichi, Japan

[73] Assignee: NKG Spark Plug Co., Ltd., Nagoya, Japan

[21] Appl. No.: 60,538

[22] Filed: Jun. 11, 1987

[30] Foreign Application Priority Data

Jul. 7, 1986 [JP] Japan .................. 61-158920

[51] Int. Cl.⁴ ............................................. F01R 31/10
[52] U.S. Cl. ........................................ 92/159; 92/160
[58] Field of Search ................ 92/158, 159, 160, 208, 92/209, 238, 156

[56] References Cited

U.S. PATENT DOCUMENTS

| | | | |
|---|---|---|---|
| 1,430,928 | 10/1922 | Spencer | 92/159 |
| 1,437,585 | 12/1922 | Douglas et al. | 92/160 |
| 1,511,135 | 10/1924 | Moser | 92/158 |
| 1,916,978 | 7/1933 | Harper, Jr. | 92/160 |
| 3,494,262 | 2/1970 | Holcombe | 92/159 |
| 3,515,035 | 6/1970 | Cuddon-Fletcher | 92/160 X |
| 4,056,044 | 11/1977 | Kamman et al. | 92/159 |

FOREIGN PATENT DOCUMENTS 140552  4/1920  United Kingdom ................. 92/160

Primary Examiner—Robert E. Garrett
Assistant Examiner—Mark A. Williamson
Attorney, Agent, or Firm—Foley & Lardner, Schwartz, Jeffery, Schwaab, Mack, Blumenthal & Evans

[57] ABSTRACT

A piston boss is formed with an oil inlet hole for collecting oil flowing downward along a piston and allowing it to flow toward a snap ring and an end of a ceramic piston pin in contact with the snap ring. The oil having lubricated the snap ring and the end of the piston pin is collected by an oil outlet hole formed in the piston boss and allowed to flow downward therethrough.

16 Claims, 2 Drawing Sheets

FIG. 3
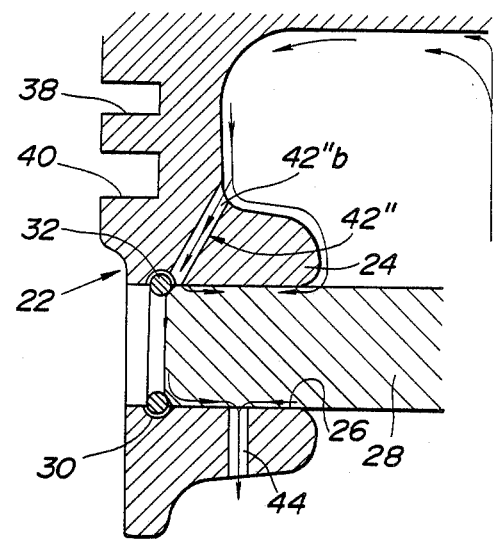
FIG. 4A
(PRIOR ART)
FIG. 4B
(PRIOR ART)
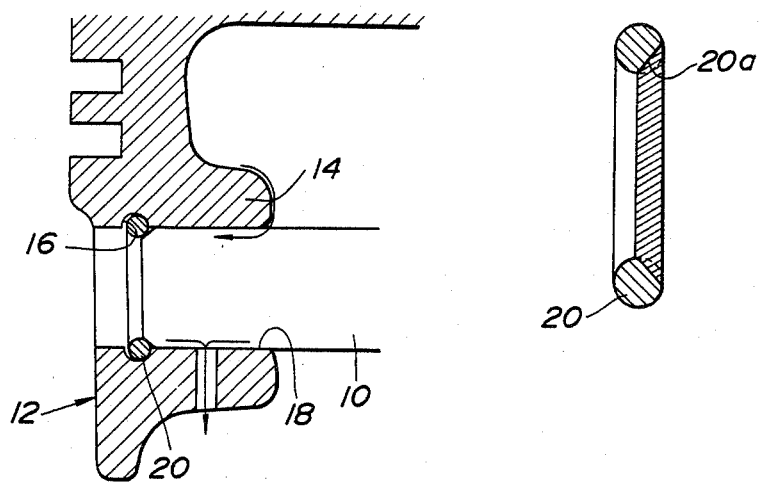

LUBRICATION MECHANISM FOR PISTON PIN AND SNAP RING

BACKGROUND OF THE INVENTION

1. Field of the Invention

The present invention relates in general to engine lubrication and more particularly to a mechanism for lubricating a piston pin and a snap ring of an internal combustion engine.

2. Description of the Prior Art

Several types of piston pins for the connection between an upper end of a connecting rod and a piston are known. One usual type is exemplarily shown in FIG. 4A, in which a piston pin 10 is full floating in both a connecting rod (not shown) and a piston 12, i.e., the piston pin 10 is journalled in piston bosses 14 and an upper end of a connecting rod (not shown) provided with a bronze bushing or bearing. The piston bosses 14 are formed with snap ring grooves 16 cut in the bearing surfaces 18 thereof. Snap rings 20 are installed in the grooves 16 to prevent endwise movement of the piston pin 10. The snap rings 20 are usually formed from a cheap metal wire for the reason of economy.

In the above described type of piston, there has been no problem in lubrication of the piston pin 10 and the snap rings 20, which are lubricated by a relatively small amount of oil flowing along the piston pin 10 and supplied thereto as indicated by the arrows in FIG. 4A, in case the piston pin 10 is made of steel or the like metal.

In recent years, there has been conducted a new trial of using a piston pin made of ceramics in place of one made of steel with a view to reducing the weight, friction losses, etc. of the engine. By this trial, a problem was found in that the snap rings 20, as shown in FIG. 4B, wear excessively at the portion 20a in contact with the piston pin 10 made of ceramics, causing endwise movement of the piston pin 10 which may in turn cause excessive wear of the bearing surfaces 18 and damage of the cylinder liner.

This problem may be solved by the piston pin 10 of which end surfaces in contact with the snap rings 20 are finished highly smoothly. This, however, results in considerable cost increase. The problem may also be solved by the snap rings 20 made of a costly metal so as to have an excellent wear resistivity, but to result in considerable cost increase.

SUMMARY OF THE INVENTION

In accordance with the present invention, there is provided a novel and improved lubrication mechanism for an internal combustion engine. The mechanism comprises means for forming an oil inlet hole in a piston boss of a piston for collecting oil flowing downward along the piston and allowing it to flow toward a snap ring groove.

This structure is quite effective for overcoming the above noted disadvantages and shortcomings inherent in the prior art device.

It is accordingly an object of the present invention to provide a novel and improved lubrication mechanism for an internal combustion engine which makes it possible to use cheap snap rings, similar to the prior art, in combination with a ceramic piston pin.

It is another object of the present invention to provide a novel and improved lubrication mechanism of the above described character which can considerably improve the life of the snap rings through a small change of structure.

It is a further object of the present invention to provide a novel and improved lubrication mechanism of the above described character which can improve the wear resistivity of a bearing surface of a piston boss and thereby improve the life of the piston.

It is a further object of the present invention to provide a novel and improved lubrication mechanism of the above described character which can assuredly prevent endwise movement of a piston pin for a prolonged period of usage without substantially increasing the cost.

It is a further object of the present invention to provide a novel and improved lubrication mechanism of the above described character which makes it possible to use a ceramic piston pin in a way substantially similarly to a prior art mechanism provided with a piston pin made of metal.

It is a further object of the present invention to provide a novel and improved lubrication mechanism of the above described character which is readily applicable to a current engine.

BRIEF DESCRIPTION OF THE DRAWINGS

FIG. 3 is a view similar to FIG. 1A but showing a further embodiment of the present invention;

FIG. 4A is a sectional view of a prior art lubrication mechanism; and

FIG. 4B is an enlarged sectional view of a snap ring employed in the prior art lubrication mechanism of FIG. 4A.

DETAILED DESCRIPTION OF THE PREFERRED EMBODIMENTS

Figure 1A:
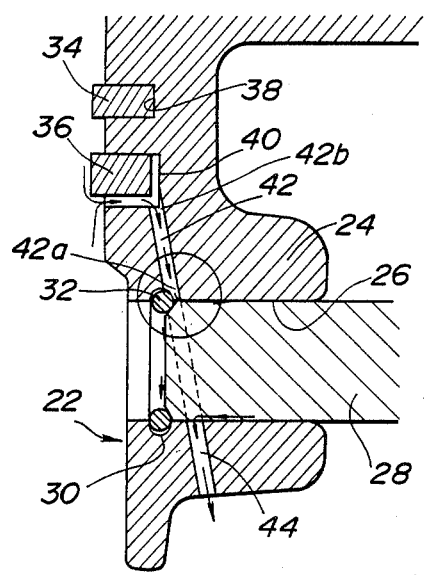
FIG. 1A is a sectional view of a lubrication mechanism according to an embodiment of the present invention.
Figure 1B:
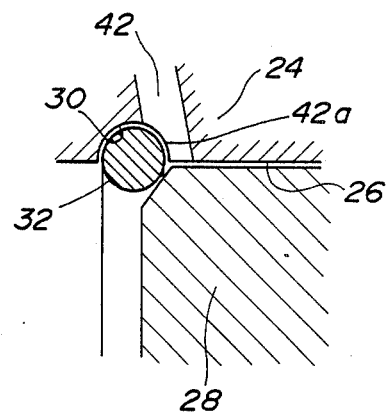
FIG. 1B is an enlarged, fragmentary sectional view of the lubrication mechanism of FIG. 1A.

Referring first to FIGS. 1A and 1B, a lubrication mechanism of this invention is shown as including a piston 22, piston bosses 24 of the piston 22, bearing surfaces 26 formed in the piston bosses 24, a piston pin 28 made of silicon nitride ceramics, snap ring grooves 30 cut in the bearing surfaces 26, snap rings 32 fitted in the snap ring grooves 30, a compression ring 34 for a combustion pressure sealing, a scraper ring 36 for scraping off the surplus of oil on a cylinder wall (not shown), and piston ring grooves 38, 40 of the piston 22 for respectively receiving therein the compression and scraper rings 34, 36. The foregoing structure may substantially follow the conventional fashion. The snap ring groove 30 is semi-circular in cross section so as to receive therein the snap ring 32 formed from a metal wire of a circular cross section and has a maximum diameter portion which is a deepest portion of the groove 30.

In accordance with the present invention, the piston 22 is formed with oil inlet holes or passages 42 providing communication between the scraper ring groove 40 and the respective snap ring grooves 30 though only one inlet hole 42 for one snap ring groove 30 is shown. Each oil inlet hole 42, which is formed by suitable machining such as drilling for instance, extends straightly through the piston boss 24. The oil inlet holes 42 introduce thereinto lubrication oil, which is collected by the scraper ring 36 at the time of operation, i.e., downward stroke of the piston 22, and further into the snap ring groove 30 as indicated by the arrows in FIG. 1A. The oil having thus introduced into the snap ring grooves 30 is joined with the oil supplied thereto in the conventional manner and lubricates the joining portions of the snap rings 32 and the piston pin 28 for thereby preventing wear of the snap rings 32.

While mere provision of the oil inlet holes 42 is effective for preventing wear of the snap rings 32, it becomes more effective for the same end when formed in such a way as shown in FIG. 1B, i.e., each oil inlet hole 42 is preferably so arranged as to have an outlet end 42a communicated with a portion of the snap ring groove 30 which is offset from the maximum diameter portion thereof inwardly of said piston 22 and also communicated with the end surface of the piston pin 28, whereby it becomes possible to introduce oil to the joining portions of the snap ring 32 and the piston pin 28 more efficiently. Each oil inlet hole 42 also has an inlet end 42b communicated with a lower, inner end portion of the scraper ring groove 40.

The piston 22 is also formed with oil outlet hole or passage 44 extending through each piston boss 24 for allowing oil having reached thereto along the piston pin 28 to flow downward through the outlet hole 44 and thereby prevent stagnation of oil at the piston boss 24 or excessive flow of oil toward the cylinder wall. The oil outlet hole 44 may be axially in alignment with the oil inlet hole 42 so that both holes are drilled at the same time.

Experiments were conducted with a motor bicycle engine provided with the foregoing lubrication mechanism and the piston pin 28 made of silicon nitride ceramics and having circumferential surfaces finished to have an average roughness value Ra=0.1 and end sintering surfaces, i.e., end surfaces obtained by sintering and not finished after sintering, in order to test effectiveness of this invention. By the experiments, it was found that there occurred little wear of the snap rings 32 in the places thereof in contact with the end sintering surfaces of the piston pin 28 after a 100-hour operation of the engine under a full throttle condition.

Figure 2:
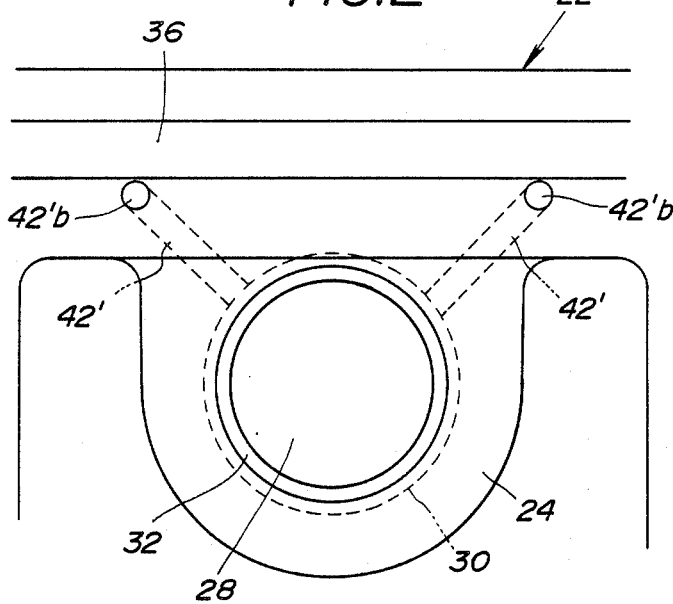
FIG. 2 is a side elevational view, taken in the axial direction of a piston pin, of a lubrication mechanism according to another embodiment of the present invention.

FIG. 2 shows another embodiment which is substantially similar to the previous embodiment except that each piston boss 24 is formed with two oil inlet holes 42' in such a manner as to make an angle of 90° with each other with respect to a side elevational view perpendicular to the axis of the piston pin 28. The inlet holes 42' have inlet ends 42'b which are located at the outer circumferential periphery of the piston 22 and adjacently below the scraper ring groove 40 and communicate with the outside of the piston 22. This embodiment can produce substantially the same effect as the previous embodiment.

FIG. 3 shows a further embodiment which is substantially similar to the previous embodiments except that each piston boss 24 is formed with an oil inlet hole 42" having an inlet end 42"b which is located at the inner circumferential periphery of the piston 22 to communicate the inside of the piston 22 for thereby introducing oil flowing downward along the inner circumferential periphery of the piston 22 into the oil inlet hole 42". This embodiment can produce substantially the same effect as the previous embodiments.

Experiments were also conducted with the prior art lubrication mechanism of FIG. 4A under a condition corresponding to that of the embodiment of FIG. 1. By the experiments, it was found that a ¼ volume of each snap ring 16 was worn off after a five-hour operation of the engine under a full throttle condition, and after a further continued operation one of the bearing surfaces was worn off excessively while making noise since the one bearing surface was reduced in its effective bearing area due to endwise movement of the piston pin.

What is claimed is:

1. A lubrication mechanism for an internal combustion engine comprising:
   a piston having a piston boss formed with a bearing surface;
   a piston pin journalled in said bearing surface;
   a groove cut in said bearing surface;
   means installed in said groove in contact with an end of said piston pin for preventing endwise movement of said piston pin;
   said piston boss having an oil inlet hole formed therein for collecting oil flowing downward along said piston and allowing it to flow toward said groove; and
   said groove being semi-circular in crosssection and having a maximum diameter portion, said oil inlet hole having an outlet end communicating in part with a portion of said groove offset from said maximum diameter portion inwardly of said piston, and communicating in part with said bearing surface.

2. A lubrication mechanism as set forth in claim 1 wherein said piston has a scraper ring groove for receiving therein a scraper ring, said oil inlet hole having an inlet end communicated with said scraper ring groove.

3. A lubrication mechanism as set forth in claim 1 wherein said oil inlet hole has an inlet end which is located at an inner circumferential periphery of said piston.

4. A lubrication mechanism as set forth in claim 1 wherein said oil inlet hole has an inlet end which is located at an outer circumferential periphery of said piston.

5. A lubrication mechanism as set forth in claim 4 wherein said piston has a scraper ring groove for receiving therein a scraper ring, said inlet end being located adjacently below said scraper ring groove.

6. A lubrication mechanism as set forth in claim 5, further having a second oil inlet hole, said first mentioned oil inlet hole and said second oil inlet hole being so arranged as to make an angle of 90° with each other with respect to a side elevational view perpendicular to the axis of said piston pin.

7. A lubrication mechanism as set forth in claim 1, further comprising an oil outlet hole formed in said piston boss for collecting oil having lubricated said snap ring and said end of said piston pin and allowing it to flow downward therethrough.

8. A piston pin and snap ring lubrication mechanism comprising:
   a piston having piston bosses respectively formed with bearing surfaces;
   a ceramic piston pin journalled in said bearing surfaces;
   said bearing surfaces being respectively formed with snap ring grooves;
   snap rings respectively installed in said snap ring grooves in contact with opposite ends of said piston pin for preventing endwise movement of said piston pin;

means for forming an oil inlet hole in at least one of said piston bosses for collecting oil flowing downward along an outer periphery of said piston and allowing it to flow toward one of said snap ring grooves; and said one snap ring groove being semi-circular in cross-section and having a maximum diameter portion, said oil inlet hole having an outlet end communicating in part with a portion of said one snap ring groove offset from said maximum diameter portion inwardly of said piston, and communicating in part with said bearing surfaces.

9. A piston pin and snap ring lubrication mechanism as set forth in claim 8 wherein said piston has a scraper ring groove for receiving therein a scraper ring, said oil inlet hole having an inlet end communicated with said scraper ring groove and an outlet end communicated with said one snap ring groove.

10. A piston pin and snap ring lubrication mechanism as set forth in claim 8 wherein said piston has a scraper ring groove for receiving therein a scraper ring, said oil inlet hole having an inlet end located at an outer circumferential periphery of said piston pin and adjacently below said scraper ring groove and an outlet end communicated with said snap ring groove.

11. A piston pin and snap ring lubrication mechanism as set forth in claim 10, further comprising means for forming a second oil inlet passage in said one piston boss in such a way that said first mentioned oil inlet hole and said second oil inlet hole make an angle of 90° with each other with respect to a side elevational view perpendicular to the axis of said piston pin.

12. A piston pin and snap ring lubrication mechanism as set forth in claim 8, further comprising means for forming an oil outlet hole in said one piston boss for collecting oil having lubricated said snap ring and said end of said piston pin and allowing it to flow downward therethrough.

13. A piston pin and snap ring lubrication mechanism comprising:

a piston having piston bosses respectively formed with bearing surfaces;

a ceramic piston pin journalled in said bearing surfaces;

snap rings respectively installed in said snap ring grooves in contact with opposite ends of said piston pin for preventing endwise movement of said piston pin;

means for forming an oil inlet hole said piston bosses for collecting oil flowing downward along an inner circumferential periphery of said piston and allowing it to flow toward said snap ring grooves; and said snap ring grooves being semi-circular in cross-section and having a maximum diameter portion, said oil inlet hole having an outlet end communicating in part with a portion of said snap ring grooves offset from said maximum diameter portion toward the inside of said piston, an communicating in part with said bearing surfaces.

14. A piston pin and snap ring lubrication mechanism as set forth in claim 13 wherein said oil inlet hole has an inlet end located at an inner circumferential periphery of said piston and an outlet end communicated with said one snap ring groove.

15. A piston pin and snap ring lubrication mechanism as set forth in claim 16, further comprising means for forming an oil outlet hole in said one piston boss for collecting oil having lubricated said snap ring and said end of said piston pin and allowing it to flow downward therethrough.

16. A piston pin and snap ring lubrication mechanism as set forth in claim 15, wherein said oil outlet end is axially aligned with said oil inlet hole.

* * * * *

UNITED STATES PATENT AND TRADEMARK OFFICE
CERTIFICATE OF CORRECTION

PATENT NO. : 4,785,720

DATED : November 22, 1988

INVENTOR(S) : Takio KOJIMA et al.

It is certified that error appears in the above-identified patent and that said Letters Patent is hereby corrected as shown below:

On the title page

In [73] Assignee:

"NKG Spark Plug" should read --NGK Spark Plug--.

Signed and Sealed this

Eighth Day of May, 1990

*Attest:*

HARRY F. MANBECK, JR.

*Attesting Officer*      *Commissioner of Patents and Trademarks*